Figure 9:
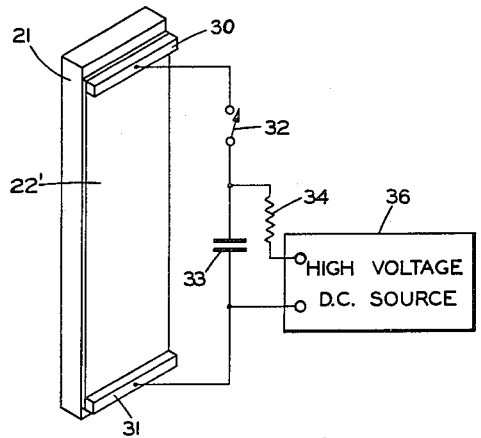

Nov. 17, 1953

H. G. BAERWALD 2,659,829

TRANSDUCER DEVICE ELECTROMECHANICALLY
SENSITIVE TO FLEXURE

Filed Dec. 28, 1948

3 Sheets-Sheet 2

INVENTOR.
HANS G. BAERWALD
BY
Harries A. Mumma Jr.
ATTORNEY

Nov. 17, 1953

H. G. BAERWALD 2,659,829

TRANSDUCER DEVICE ELECTROMECHANICALLY
SENSITIVE TO FLEXURE

Filed Dec. 28, 1948

3 Sheets-Sheet 1

*INVENTOR.*
HANS G. BAERWALD
BY
ATTORNEY

Nov. 17, 1953 H. G. BAERWALD 2,659,829
TRANSDUCER DEVICE ELECTROMECHANICALLY
SENSITIVE TO FLEXURE
Filed Dec. 28, 1948 3 Sheets-Sheet 3

*INVENTOR.*
HANS G. BAERWALD
BY

ATTORNEY

Patented Nov. 17, 1953

2,659,829

UNITED STATES PATENT OFFICE 2,659,829

TRANSDUCER DEVICE ELECTROMECHANI-
CALLY SENSITIVE TO FLEXURE

Hans G. Baerwald, Cleveland Heights, Ohio, assignor, by mesne assignments, to Clevite Corporation, Cleveland, Ohio, a corporation of Ohio Application December 28, 1948, Serial No. 67,645

10 Claims. (Cl. 310—8.5)

This invention relates to a transducer device electromechanically sensitive to flexure of an electromechanically responsive element of the device. More particularly, this invention relates to a bending-sensitive or twisting-sensitive electromechanical transducer device in which such flexure is associated with mechanical reaction between portions of the device which tend to deform individually to different extents or in different senses during transducing.

Transducer devices electromechanically sensitive to bending or twisting of an element therein are well known to the art of electromechanical transducers. In a conventional form such a transducer comprises two plates cut, for example, from a single crystal of Rochelle salt, electroded on each major face of each plate, and affixed together at an electroded surface of each plate with a crystallographic orientation such that one plate tends to expand while the other plate tends to contract. During transducing, bending motions of the composite element result in the development of electrostatic fields in the two plates, and vice versa. Flexure-sensitive devices of the type just described may be termed composite devices, since they are made up of two or more distinct parts or elements with a pronounced interface therebetween. Such devices, fabricated of two or more plates or bars cemented together at interfaces which constitute major structural discontinuities in the composite device, have proved useful commercially in many applications, including microphones and phonograph pickups. Fairly high transducing efficiencies may be achieved with such elements. However, the method of fabrication necessary in the production of composite elements contributes materially to their cost. Furthermore, the operating efficiency of such composite elements often is limited by the unavoidable structural imperfections and discontinuities at the boundaries between the plates making up the element. To illustrate the loss of efficiency attributable to such structural discontinuities, the cementing material which is used to bond the two plates to the electrode or electrodes between them and to each other may have a shear modulus of elasticity substantially less than the modulus of the several crystal plates and also may adhere imperfectly to them, so that a substantial proportion of the bending motion applied to the device is lost in shear strains in the cementing material.

It also has been proposed to form composite bending-sensitive devices using two plates of barium titanate material cemented together at a major face of each plate. Electromechanical devices utilizing plates of titanate material, and composite bending-sensitive electromechanical devices comprising a plurality of superimposed, individually electroded layers of titanate materials, are disclosed and claimed in the respective copending applications Ser. Nos. 740,460 and 740,461, filed April 9, 1947, in the name of Hans Jaffe and assigned to the same assignee as the present invention. These applications issued as Patents Nos. 2,592,703 and 2,484,950, respectively, on April 15, 1952, and October 18, 1949, respectively. The titanate material, when conditioned by the application of a unidirectional electric potential thereto, may exhibit very large ratios of mechanical strain to applied signal voltage. This electromechanical response is substantially linear if a suitably strong unidirectional potential has been or is being applied. This large linear response probably depends both on the electrostatic polarization of the dielectric material by the unidirectional voltage applied thereto and on the properties of the material before polarization.

Bender elements made of a number of layers of titanate material have the same advantages as the Rochelle salt benders described hereinabove, and in addition partake of the rugged mechanical and chemical properties and the relative ease of manufacture of plates of titanate ceramic materials. However, such composite elements also are subject to the disadvantage of the rather complex operations necessarily involved in fabricating a composite device. They also are limited in efficiency by the properties of the cement and other materials used between the several plates making up the elements. Another factor influencing the efficiency of the bending-sensitive devices of the types described hereinabove is the relationship of voltage distribution within the elements to the flexing moments of the hypothetical inner and outer layers of the material of the elements. The outer layers are most effective in producing or responding to bending, while the layers near the center make only slight contributions to the bending response. Nevertheless the voltage drops across the dielectric material of the central layers are as great as the drops across the outer layers. As a result the available electrical energy is expended approximately equally in the relatively ineffective and the relatively effective layers instead of to a greater extent in the more effective outer layers, so that the highest efficiency is not obtained.

Accordingly, it is an object of the present invention to provide a new and improved transducer device electromechanically sensitive to flexure and free of some or all of the limitations and disadvantages of prior art devices.

It is another object of the invention to provide a new and improved transducer device electromechanically sensitive to flexure but not limited in efficiency by the properties of a cementing material.

It is a further object of the invention to provide a new and improved transducer device electromechanically sensitive to flexure which is capable of fabrication by simple operations from inexpensive material.

It is a still further object of the invention to provide a novel transducer device electromechanically sensitive to flexure and utilizing electromechanically sensitive ceramic materials in a simplified structure providing desirable matching of the intrinsically high mechanical stiffness of the electromechanically sensitive material to relatively flexible mechanical systems such as are encountered in acoustic devices.

It is yet another object of the invention to provide a novel flexure-sensitive transducer device having high efficiency as a result of an improved distribution of voltage and flexing moments.

In accordance with a feature of the invention, a transducer device electromechanically sensitive to flexure comprises a body substantially free of structural discontinuities with two electrodes adjacent to generally opposed surfaces of the body. The body has between these two electrodes one substantial portion of a dielectric material which is conditioned by the application of a unidirectional electric potential to provide a substantial transducing-response characteristic as between mechanical signal energy and electrostatic-field signal energy, and also has between the two electrodes another substantial portion of a material which has a transducing-response characteristic as between the aforementioned signal energies substantially different from the first-mentioned transducing-response characteristic. The device also comprises means including the aforesaid electrodes adjacent to the body for translating currents associated with the electrostatic-field signal energy in the body, and mechanical means for translating the motion associated with the flexure during transducing, this flexure being associated with mechanical reaction between the one portion of the body having the aforementioned substantial transducing-response characteristic and the other portion of the body. As will appear hereinbelow, the last-mentioned portion of the transducer body, which has a transducing-response characteristic different from that of the first-mentioned portion, may have a substantially zero-valued transducing-response characteristic and thus may exhibit no appreciable electromechanical response except by mechanical reaction with the first-mentioned responsive portion.

Further in accordance with the feature of the invention just mentioned, the first-mentioned portion of the body is conditioned by the application of the unidirectional electric potential in a direction between the two electrodes to provide in that one portion of the body the aforesaid substantial transducing - response characteristic, and the electrostatic signal energy with which this characteristic is concerned involves a field in a direction between the two electrodes. It will be understood that the electrodes and circuit means coupled thereto are arranged for translating currents associated with signal fields so directed.

In accordance with a related aspect of the invention, the transducer device described above as being in accordance with a feature of the invention has simply a single pair of electrodes, individually adjacent to two opposed surfaces of the body. In this case, of course, the electrostatic-field signal energy in the body is associated with currents translated by these two electrodes alone, there being no other means of coupling between electrostatic fields in the body and external circuits.

In accordance with another feature of the invention, the device is similar to those described in the above statement but is not necessarily limited to the two electrodes arranged as mentioned hereinabove. In this case the application of the unidirectional electric potential provides in the first-mentioned portion of the body a substantial transducing-response characteristic as between mechanical signal energy involving expansion or contraction in one direction within the body and electrostatic signal energy involving a field directed transversely of that one direction. In this case the electrodes and any interconnected circuit means translate currents associated with the transverse electrostatic-field signal energy in the body, and the flexure during transducing is associated with mechanical reaction between the one portion, having the substantial transducing-response characteristic involving the aforementioned expansion or contraction, and the other portions of the body.

For a better understanding of the present invention, together with other and further objects thereof, reference is had to the following description taken in connection with the accompanying drawings, and its scope will be pointed out in the appended claims.

Figure 10:
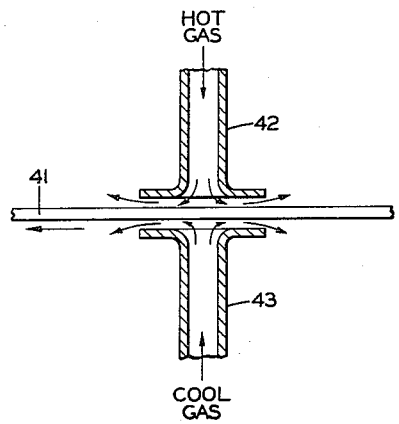
Figure 13:
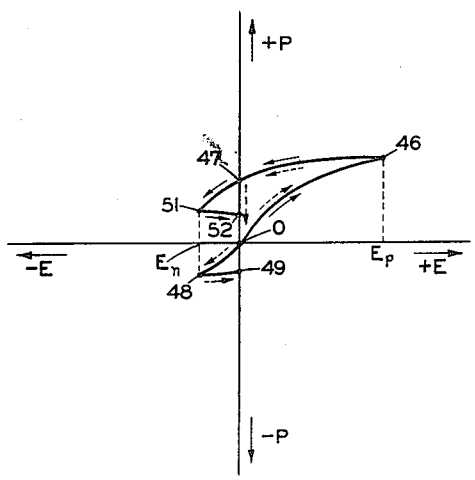
Figure 14:
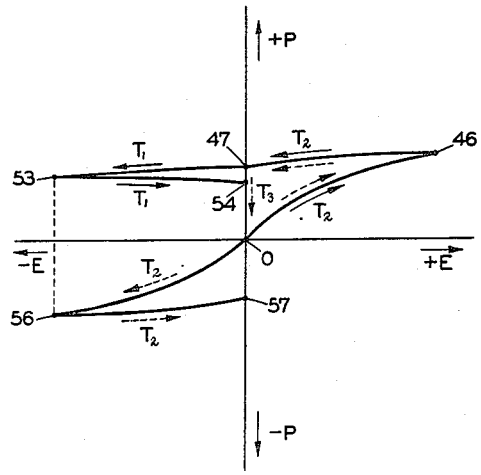
Figure 1:
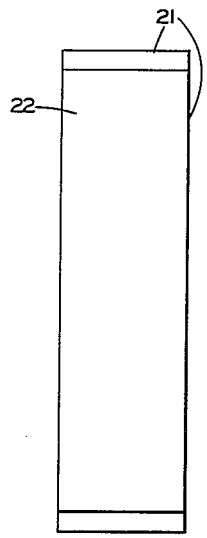
Figure 2:
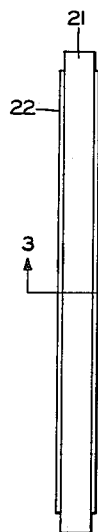
Figures 3, 4:
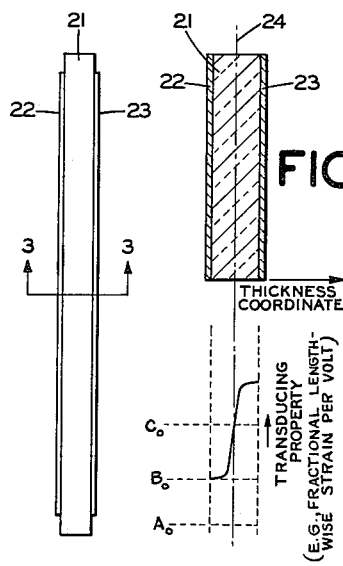
Figure 5:
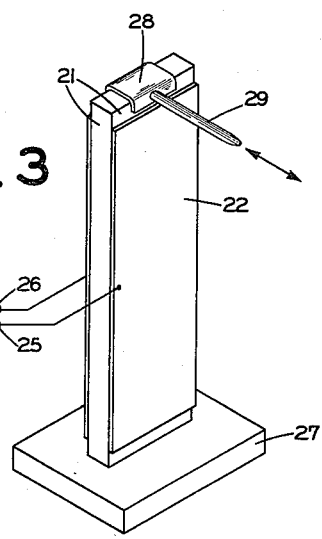
Figure 15:
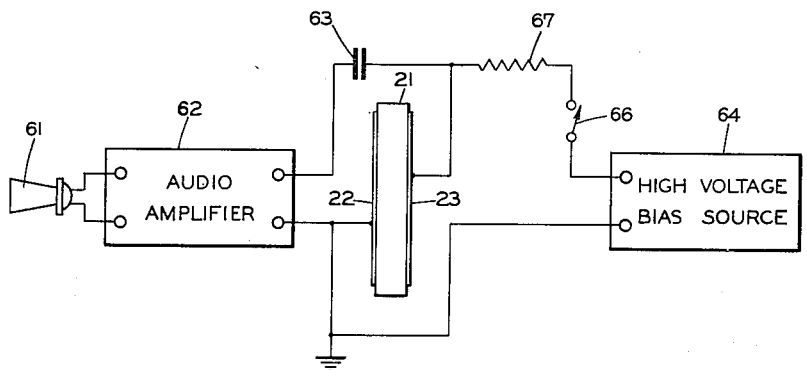
Figure 16:
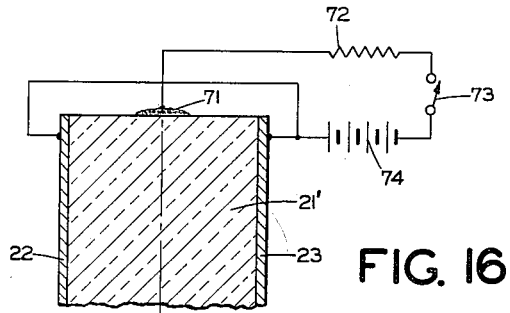
Figure 17:
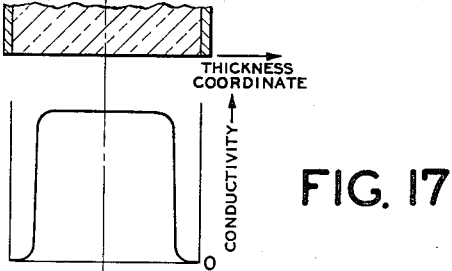
Figure 18:
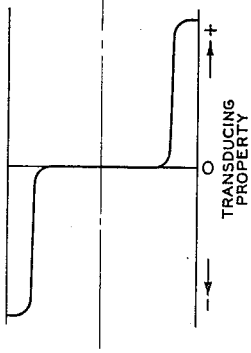

In the drawings, Figs. 1 and 2 are front and side elevations respectively of an electroded body having electromechanical transducing properties and useful in devices in accordance with the present invention; Fig. 3 is an enlarged sectional plan view of this body taken in the direction 3, 3 of Fig. 2; Fig. 4 is a rough plot of one representative variation with thickness of the transducing properties of the body illustrated in section in Fig. 3, the thickness coordinate of the plot of Fig. 4 being aligned with the thickness direction in Fig. 3; Fig. 5 is a perspective view of a transducer device in accordance with the present invention utilizing the body illustrated in Figs. 1–3; Figs. 6, 7, 8, 11 and 12 are enlarged plan views of the body illustrated in Figs. 1–5, showing schematically the conditions of remanent electrostatic polarization of various cross-sectional parts of the body before and after being treated to provide an electromechanical element in accordance with several embodiments of the present invention; Figs. 9 and 10 illustrate alternative arrangements for effecting the polarization conditions illustrated in Fig. 8; Figs. 13 and 14 are graphs representing several types of polarizing cycles useful in obtaining the conditions of remanent polarization represented schematically in Fig. 12; Fig. 15 is a schematic diagram illustrating the application of a particular transducer device embodying the present invention in an audio-frequency electromechanical transducing arrangement; Fig. 16 is a greatly enlarged sectional plan view, partly broken away, of an electroded body and associated equipment useful in connection with another embodiment of the transducer of the invention; and Figs. 17 and 18 are rough plots of the local electrical and electromechanical properties of the body illustrated in Fig. 16, the thickness coordinate of these plots being aligned with the thickness direction in Fig. 16.

Referring now to Figs. 1, 2, and 3 of the drawings, there is illustrated a body 21 suitable for use as the sensitive element in a transducer device embodying the present invention. The body 21 is of small thickness compared with the other dimensions thereof and is made up of polycrystalline dielectric material substantially free of structural discontinuities. This body is provided with a single pair of electrodes 22, 23 in generally opposed positions across the body and individually adjacent to the major surfaces thereof. These electrodes advantageously cover a large portion of the opposed surfaces to which they are applied; but it may be desirable to leave margins at the edges of the surfaces. As illustrated, unelectroded margins are provided at the top and bottom of the body to facilitate mechanical connections to the body. The electrodes are shown with exaggerated thickness for ease of illustration.

The body 21 is not made up of two or more distinct parts or elements, nor is there a pronounced interface anywhere within the body. Hence, the body may be termed noncomposite, and from a mechanical point of view is substantially free of structural discontinuities. In this connection, of course, the macroscopic rather than the microscopic condition of the body is considered, and it is recognized that the micro-structure of the body may involve numerous crystalline grains having phase boundaries but forming essentially one structure as regards bending or twisting forces applied to the body within the elastic limits.

However, in spite of its noncomposite character, the body may have two or more portions of substantial size having individually different properties. Thus, one substantial portion of the body 21, located between the two electrodes 22 and 23, underlies that major surface of the body which appears to the right in the views of Figs. 2 and 3. This one thickness portion extends from the right hand major surface toward the plane of the thickness center line 24 of the body 21, and is disposed generally parallel to the major surfaces of the body. This portion is of a dielectric material which is conditioned by the application of a unidirectional electric potential in a direction between the two electrodes 22 and 23 to provide in this one portion a substantial transducing-response characteristic as between mechanical signal energy and electrostatic-field signal energy. For example, this one portion may be made up primarily of polycrystalline barium titanate. The unidirectional potential, applied to condition the material of this portion of the body, should be rather strong, that is, strong enough to produce in that material a unidirectional field strength which is of an order of magnitude at least as great as the amplitudes of the incremental electrostatic field strengths associated with the useful electrical signals to be developed in the body during transducing.

Now, the conditioning effect of the unidirectional potential so applied to the material may be recognized for the purposes of the present specification and claims by the electromechanical response of the transducer device containing the material. However, it may be helpful to view the effect of the unidirectional potential as one of producing an internal electrostatic bias polarization in a suitable material. With certain materials, such as a material primarily of barium titanate, a large fraction of this internal polarization remains after removal of the polarizing field. Consequently with such materials a continuous application of the conditioning potential is not essential. However, a high permanent polarization ordinarily is obtained only when the temperature of the material remains sufficiently far below a certain transition temperature at all times during the conditioning treatment and thereafter to the time of use. For example in the case of barium titanate this transition temperature is about 120° C. In most cases the polarizing field should be much stronger than the signal fields to be expected and may approach the breakdown field strength of the material. The polarization condition thus obtained makes possible the practical utilization of the implicit electromechanical properties of the material, since it has the effect of providing a linear local electromechanical transducing property of substantial magnitude in the titanate material.

Summarizing, it thus will be understood that a suitable dielectric material is conditioned in the sense here used by a present or future application of the aforementioned unidirectional potential, and by a previous temporary application in the case of a material exhibiting permanent polarization at the temperatures of polarization and of use.

In addition to the one portion of the body 21 mentioned above, the body has another substantial portion also located between the two electrodes 22 and 23. This other portion underlies the left hand surface, as viewed in Figs. 2 and 3, and extends toward the center line 24. This thickness portion thus is disposed generally parallel to and laterally of the first-mentioned portion.

This other portion is of a material with a transducing-response characteristic, as between mechanical and electrostatic-field signal energies, which is substantially different from the transducing-response characteristic of the right hand portion of the body. The difference in the transducing-response characteristics of the two portions may be, for example, a result of a polarization condition in the left hand portion differing in magnitude or in directional sense from the polarization in the right hand portion. The nature of the material in the left hand portion and the treatment, if any, given that portion to obtain the desired properties therein will be described more specifically hereinbelow.

The local electromechanical transducing properties of the several portions of the body 21 have been referred to hereinabove as transducing-response characteristics. In effect, the characteristic of one portion of the body may be influenced by the arrangement of the body as a whole; for example, this arrangement may determine the voltage distribution across the body. Accordingly, for the purposes of this specification and the appended claims, it is convenient to define the transducing-response characteristic of the material in a portion of the body 21 with respect to an electric signal potential appearing across the entire body. The characteristic so defined applies, inter alia, to cases in which from whatever cause the electrostatic field strength is different in different layers within the body. Thus, it is convenient to consider a transducing-response characteristic as between incremental mechanical energy per unit volume of the body and an incremental potential difference across the body, the incremental potential difference being associated with an incremental electrostatic-field energy per unit volume. The incremental mechanical energy just referred to is the, in general adiabatic, energy of elastic deformation in any volume unit under consideration. These incremental mechanical and electrical energies transduced in numerous volume elements of the body are directly linked with the mechanical and electrical signals, respectively developed in the transducer during operation.

Fig. 4 illustrates qualitatively the local electromechanical transducing properties of various portions of the body 21. In the plot of Fig. 4, the horizontal direction is the thickness coordinate of the body 21, and the plot is aligned vertically with the sectional view of Fig. 3, so that horizontal position on the plot may be referred directly to the location in the thickness direction through the body 21. The vertical coordinate in the plot of Fig. 4 represents qualitatively the relative values of the transducing properties. The plot does not indicate the absolute values of a transducing property. Its value need not be zero in any region of the body, but may vary, for example, from a relatively low value on one side, say the left side in Figs. 3 and 4, to a relatively high value of the same sign on the other side, say the right side in Figs. 3 and 4, in a manner represented in Fig. 4. In this case, of course, a transducing property represented along the vertical coordinate in the plot of Fig. 4 would have zero value at a value of the ordinate lower than the bottom of the plotted curve, as at $A_0$. The plot of Fig. 4 also may represent the case where the transducing property has zero value at a major surface, for example the left hand surface of the body, as indicated at $B_0$, or near its central line, as indicated at $C_0$. Therefore, the location, if any, where the local transducing property passes through zero is not indicated for the general case on the plot of Fig. 4. The plot does indicate, however, that in general the portions of the body near the two major surfaces thereof have substantially the extremes of values of transducing-response characteristics in the body. In a bending-sensitive transducer body, the resulting or net bending moment is the sum of the moments contributed by each portion of the body, each of these local bending moments being the product of the transducing-response characteristic of the portion considered and its distance from the neutral plane of bending. In determining a bending moment not only the characteristic but also the distance may be individually positive or negative, resulting in a positive moment if the characteristic and the distance have the same sign and a negative moment if they have opposite signs. If the overall or net bending is in a sense which is arbitrarily designated positive, only those portions of the body providing positive bending moments can aid in the bending, while portions providing negative moments tend to diminish the bending response. Therefore it is desirable that the largest absolute values of the transducing-response characteristics occur near the two opposed surfaces but with opposite signs, since at these surfaces the distances from the neutral plane are greatest but have opposite signs relative to the neutral plane. In this case the transducing property would have zero value near or at the central plane, as represented by $C_0$ in Fig. 4.

Any of various local transducing properties might be plotted to obtain the curve of Fig. 4. The transducing-response characteristic as defined hereinabove may be used. In this case, for example, after polarization of the body 21 by the application of a high unidirectional voltage across the electrodes in the thickness direction, the mechanical effect of the electric signal field resulting from the application of unit voltage across the electrodes is plotted for small volume portions of the body. The mechanical effect may be expressed in terms of the fractional or percentage distortion or strain in a direction lengthwise of the body, since this type of strain is associated with the desired bending response.

A complete transducer device which is electromechanically sensitive to flexure, and in particular to bending, is illustrated in Fig. 5. The device includes the body 21 and its electrodes, electrical-circuit terminals 25 and 26 connected to the electrodes 22 and 23 respectively, a base 27 in which the lower end of the body 21 is mounted securely, a yoke 28 secured to the top of the body 21, and a rod 29 projecting horizontally from the yoke 28 for providing mechanical coupling to the device.

In operation, the device of Fig. 5 may be used to transduce from electrical signal energy to mechanical signal energy or from mechanical signal energy to electrical signal energy. Thus the device may function as a loud speaker or as a phonograph pickup. In the former case, a source of electrical signals, such as the audio frequency amplifier of a conventional radio receiver circuit, not shown, is connected to the terminals 25 and 26, while, in the latter case, an arrangement for utilizing electrical signals, such as an audio amplifier followed by a loud speaker, not shown, is connected to these terminals. Correspondingly, in the former case the rod 29 may actuate in a conventional manner a loud speaker diaphragm, not shown, while in the latter case the rod 29 may be driven by the surface variations of a phonograph record, not shown. In either case, the device comprises means, including the electrodes 22, 23 and terminals 25, 26, and amplifier or other arrangements in circuit therewith, for translating currents associated with the electrostatic-field signal energy transduced in the body. During transducing, electric signal potentials, corresponding to the electrostatic-field signal energy in the body, appear between the opposed electrodes 22 and 23. Thus the electrostatic signal energy being utilized involves a field in a direction between these two electrodes. Furthermore, the yoke 28 and rod 29 constitute mechanical means for translating the motion associated with the flexure of the body 21 during transducing.

With the usual arrangement, the flexure takes the form of a bending of lines extending vertically through the body 21. For example, when the local transducing properties of the body are such as to cause, upon application of a signal potential between the electrodes 21 and 22, a tendency of portions of the body to one side of the center line 24 to expand and a simultaneous tendency of the portions to the other side of the center line to contract, the top of the body 21 bends toward the side which tends to contract. A body having such an operation is discussed hereinbelow in connection with Figs. 12-14, which deal with the production of the local transducing properties of the type just mentioned. It will be understood that the mechanical signal energy transduced involves this expansion or contraction in one direction within the body, in this case the vertical direction as viewed in Fig. 5. The bending flexure resulting from the aforesaid expansion and contraction is associated with mechanical reaction between the portion of the body underlying the aforesaid right hand surface, and having the aforesaid substantial transducing-response characteristic involving expansion or contraction in a vertical direction, and the other portion of the body underlying the left hand surface. The electrostatic signal energy transduced involves, of course, the field produced by the signal potential applied between the electrodes, and this field, being in the thickness direction in the body 21, is seen to be directed transversely of the vertical direction of expansion and contraction within the body. It will be clear also that the application of a voltage of opposite polarity causes bending in the other direction. Furthermore, the application of signal forces longitudinally of the rod 29, causing bending motions, results conversely in the appearance of signal potentials between the opposed electrodes. The conversion of the expansion effects to bending response effects, through mechanical reaction between the portions of the body having different transducing response characteristics, provides an efficient means of matching the mechanical impedance of a body of stiff electromechanically sensitive material to the impedance of a given mechanical system. It is not necessary, however, to provide transducing properties in both sides of the body in order to obtain such bending responses, as will be indicated hereinbelow in connection with Figs. 6–10.

As mentioned hereinabove, it is preferred to use a body 21 of a polycrystalline dielectric material, and in a preferred embodiment of the invention the body is of a polycrystalline titanate material. The body advantageously is made up primarily of polycrystalline barium titanate. Thus, there may be provided a substantially homogeneous body of permanently polarizable polycrystalline dielectric material. The treatment of such a body to provide a variation of the transducing characteristic with location through the body, as referred to above in connection with Fig. 4 now will be described.

Figure 6:
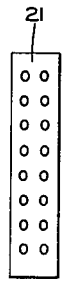
Figure 7:
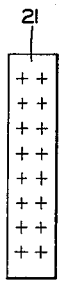
Figure 8:
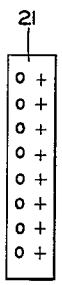

Figs. 6, 7, and 8 represent schematically various conditions of remanent internal electrostatic polarization of the body 21, indicating the polarization across a transverse surface, such as that of the cross-sectional view of Fig. 3, at various stages of treatment of the body. In Fig. 6 the unpolarized condition of the material as originally produced by ceramic firing is represented by small circles. After the dielectric material has been polarized by applying a high unidirectional voltage across the electrodes, the condition represented by the plus signs in Fig. 7 obtains, where the polarity of the polarizing field arbitrarily is designated to be positive and the entire cross section is seen to be so polarized. It will be understood that the polarizing field is produced in a direction between the two electrodes 22 and 23, which is in a transverse or lateral direction, so that the plus signs in Figs. 7 and 8 represent lateral polarization, for example from left to right as viewed in Figs. 7 and 8. After the material thus has been polarized by an electrostatic field, a portion of the body is at least partially depolarized by localized heating to provide a substantial variation with location through the body of remanent electrostatic polarization and a consequent substantial variation of local electromechanical transducing properties. In Fig. 8 this condition is represented schematically by small circles on the left hand side of the bar, which side has been depolarized, while the right hand side remains polarized in the positive direction. When the body is composed of polycrystalline barium titanate material, it may be polarized by the application of a biasing field at room temperature. However, heating a portion of the polarized material to a temperature either close to or above its transition temperature, which is approximately 120° C., for a sufficient length of time has the result of destroying the polarization in the portion so heated.

Alternative arrangements are shown in Figs. 9 and 10 for effecting the localized heating necessary to destroy remanent polarization in one portion of the body, for example the left hand portion as represented in Fig. 8. As illustrated in Fig. 9, a temporary electrode 22' is placed on the side of the polarized body 21 on which the heat is to be applied. This electrode should be of uniform thickness, and evaporated gold has been used successfully for this purpose. Heavy conductors 30, 31 are placed across the electrode 22' at each end thereof so that a uniform current distribution may be obtained across the width of the electrode 22'. The conductors 30 and 31 are connected to each other through a switch 32 in series with a condenser 33. There also is connected across the condenser 33 through a high resistance 34 a high voltage D. C. source 36. The source 36 is permitted to charge the condenser 33 to the voltage of the source through the resistor 34. When the switch 32 is closed, a heavy pulse discharge of current flows from the condenser 33 vertically through the thin electrode 22', causing a burst of heat to be applied to one side of the body 21. As a result a pulse of elevated temperature travels through the thickness of the body 21 from the surface carrying the temporary electrode 22'. After the energy stored in the condenser 33 has been dissipated during the initial current discharge, further substantial current is prevented by the voltage drop in the resistor 34. Thus, it will be apparent that, with suitable adjustment of the thickness of the electrode 22' to determine its resistance, of the voltage of the source 36, of the capacitance of the condenser 33, and of any other circuit constants determining the discharge time constant, the total heat dissipated and the length of time during which it is dissipated may be varied at will and so arranged as to raise approximately half of the thickness of the body 21 temporarily to temperatures in the neighborhood of or higher than the transition temperature, or Curie point, of the material involved. As the temperature pulse progresses through the body, however, it is attenuated progressively so that the other half of the body is not heated to such high temperatures. Thus, referring to Fig. 8, the right hand portion of the body retains substantially its original state of remanent polarization.

Alternatively, a strip of titanate material 41 may be subjected to a thermal treatment in the apparatus illustrated in Fig. 10 to achieve the partial depolarization. It is understood that the strip 41 already has been polarized in the thickness direction referred to as positive and may be cut into lengths suitable for use as the body 21 after treatment by the method represented in Fig. 10. The strip 41 passes between two nozzles 42 and 43 each having about the same width as the strip and flanged in both directions longitudinally of the strip. The nozzles are sectionalized in Fig. 10 to indicate their internal arrangement. A small space is left between the flanges and the strip, the latter being guided by suitable means, not shown, to retain the desired spacing. Hot gas, preferably at a temperature well above the Curie point of the material, passes through the nozzle 42 and escapes forward and backward between the flanges and the strip 41. Likewise cool gas, which may be at room temperature or colder, passes through the nozzle 43 to prevent heating of the side of the strip nearer the nozzle 43 to a temperature in the neighborhood of the Curie point. With the illustrated arrangement, the strip 41 may be moved between the nozzles in the direction of the arrow at a rather small but not critical rate; the desired thermal conditions may be obtained solely by adjustment of the temperatures and rates of flow of the hot and cold gases. After the strip 41 has passed the nozzles and cooled somewhat, it may be cut into the desired lengths to form bodies such as that illustrated in Figs. 1–3 and having the substantial variation with location in the thickness direction through the body of remanent electrostatic polarization represented schematically in Fig. 8.

The local electromechanical transducing properties of a homogeneous polycrystalline titanate body may be thought of as being determined by the local conditions of electrostatic polarization of the body. Thus, a substantially linear relationship between incremental mechanical energy and incremental electrostatic-field energy exists in a well conditioned or polarized portion of the material, and the transducing characteristic may have such a high value under these circumstances as to be very useful in practice. However, such a linear characteristic is not obtained in unpolarized portions of the body, which, practically speaking, are inert or insensitive as regards useful or linear electromechanical properties. This condition is represented in the plot of Fig. 4 by the case in which the zero value of the transducing properties, indicated at $B_0$, occurs at the left hand surface of the body 21; in this case the transducing property has negligible magnitudes in most of the left hand portion of the body, as represented in Fig. 4. As a result, the depolarized side of the body represented in Fig. 8 serves primarily as a stiff backing for the side of the body having a positive polarization, whereby a tendency of the polarized portions to expand or contract brings about mechanical reaction with the unpolarized portions, causing a bending motion of the entire body.

Thus it will appear that, in accordance with a feature of the present invention, the process of producing a transducer device electromechanically sensitive to flexure comprises placing conductive electrodes adjacent to two generally opposed surfaces of a homogeneous body of polycrystalline dielectric material capable of acquiring remanent electrostatic polarization and applying a unidirectional electric potential across these electrodes for a predetermined period of time to induce such remanent polarization in the dielectric material and provide a substantial transducing-response characteristic therein. A first substantial portion of the homogeneous body then is subjected to localized heating to eliminate at least partially both the remanent electrostatic polarization and the concomitant transducing-response characteristic in that one portion while retaining the remanent polarization in a second substantial portion of the dielectric material, whereby the body acquires an electromechanical sensitivity to flexure associated with mechanical reaction between the second portion which retains the transducing-response characteristic and the first portion. The process under discussion is completed by affixing to the body mechanical motion-translating means adapted to move in accordance with the flexure during transducing.

Figure 11:
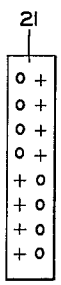

If desired, depolarization can be carried out in a different manner to provide a transducer device in which the mechanical reaction between the portions of the body having different values of the local electromechanical transducing properties is such as to afford a torque or twister motion. For example, the temporary electrode 22' in the Fig. 9 apparatus may extend the full length of the body 21 but cover only half of its width, starting on one edge of the body. In this case, not only is the depolarization limited to half the thickness of the body due to the temperature gradients during treatment, but also only half of the width will be depolarized. The resulting polarization condition is represented schematically in Fig. 11 by the small circles to the left in the upper half of the figure, while the portions to the left of the lower half remain polarized. Now a similar heat treatment may be applied at the same time or subsequently to the opposite face of the body but on the other half of its width. As seen in the transverse plan view of Fig. 11, this causes depolarization in the lower half of the figure but only in the right hand portions of the body. A thin body may be polarized as represented in Fig. 11 and mounted as shown in Fig. 5. The yoke 28 on such a thin body, and any device mechanically coupled to the yoke tend to twist about a vertical axis upon the application of signal voltages across the electrodes 22 and 23. Conversely, the application of torques to the yoke 28 causes signal voltages to appear at the terminals 25, 26. It will be clear that similar results may be obtained by fastening together a number of bending-sensitive bodies; for example, two narrow noncomposite bodies having the characteristics represented in Fig. 8 may be fastened side-by-side with opposite directions of polarization to obtain an element resembling that represented in Fig. 11.

Figure 12:
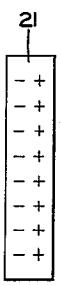

Fig. 12 represents schematically the body 21 as represented in Fig. 8 but with the left hand side, which previously has been depolarized, having a remanent polarization in the opposite or negative direction. This new polarization is represented by minus signs indicating a lateral polarization, for example the polarized condition resulting from an effective unidirectional field between electrodes 22 and 23 in a direction from right to left as viewed in Fig. 12. The method of effecting such a variation of remanent polarization through the body is represented by the graph of Fig. 13, in which electrostatic field strength E in the body is represented in the positive and negative directions along the horizontal coordinate direction and polarization P is represented in the positive and negative directions along the vertical coodinate direction. The conditioning treatment of the right hand portion of the body represented in Figs. 6, 7, 8, and 12 is indicated by the solid line arrows in the graph of Fig. 13, while the treatment of the left hand portion is represented by the dashed line arrows. Starting with the virgin material at the origin of coordinates 0, the material is as represented in Fig. 6. Upon the application of a unidirectional potential to provide a high field strength $E_p$ in the positive direction, the material is polarized as illustrated by the solid and dashed arrows between the points 0 and 46 in Fig. 13. When the polarizing field is removed, all portions of the body follow the solid and dashed arrows to assume the condition of positive remanent polarization represented by the point 47 in Fig. 13 and by the plus signs in the diagram of Fig. 7. During the depolarizing treatment of the left hand portion of the body, for example by localized heating using the apparatus of Fig. 9 or 10, the state of the material in only the left hand portion changes as represented by the vertical dashed arrow reverting to the point 0 in the Fig. 13 graph and assuming the condition of polarization represented in Fig. 8. As described above, the body may be used in a bender device after this treatment.

However, this treatment may be followed by polarizing by an electrostatic field of opposite polarity and of predetermined strength $E_n$ corresponding to the vertical dotted line to the left on the graph of Fig. 13. This causes the previously depolarized portion to reach the point 48 in Fig. 13 while this field is applied, and then to return to the condition of remanent polarization having a polarity opposite from that of the original polarization and represented by the point 49. During this same treatment the remainder of the body passes from the point 47 through the point 51 and thence to the point 52 in Fig. 13. While the application of the negative field tends to detract somewhat from the remanent polarization of the right hand portion of the body, the field strength used is substantially less than the coercive field strength that would depolarize it completely, so that the remainder of the body retains at least part of the original polarization. Since the left and right hand portions of the body now are oppositely polarized, a signal potential applied across the body causes a tendency for expansion of one portion and simultaneous contraction of the other, resulting in bending in a manner described hereinabove. The difference of polarization between the two portions of the body, represented by the distance between the points 49 and 52 in Fig. 13, is of the same order as the original polarization 0—47 of the right hand portion, although the tendency is to increase this difference, inasmuch as the steepness of the initial part of the virgin curve 0—48 in general exceeds that of the depolarization curve 47—51. But even ignoring the improvement thereby effected, the bender device resulting from the treatment just described has the advantage that expander effects can be substantially eliminated, due to the differential motions of the two sides of the body. The transducing-response characteristics of the two portions of the body nevertheless are greatly different, because they have opposite signs although of practically the same absolute magnitudes. Since the portions of the body near the two major surfaces thereof have at least as high magnitudes of transducing-response characteristics as portions more remote from these surfaces, the portions near these surfaces have substantially the extremes of values of the characteristics in the body. When the polarization in the left and right hand portions of the body is substantially symmetrical, the zero value of the transducing property occurs in the center of the body, as indicated at $C_0$ in Fig. 4.

Fig. 14 represents an improved method of treatment of the body 21 to obtain the variation of remanent polarization represented in Fig. 12. The coordinates have the same significance as in the graph of Fig. 13, where 0 is the origin of coordinates. Just as in Fig. 13, the initial polarization causes all portions of the material to pass through the point 46 to the point 47, as represented by the solid and dashed arrows. However, the body may be subjected to the original polarizing electrostatic field at one predetermined temperature $T_2$, which may be substantially higher than room temperature but substantially lower than the Curie point of the material. The left hand portion of the body then is depolarized by localized heating of only those portions to a temperature $T_3$ in the neighborhood of or above the Curie point, so that the left hand and right hand portions of the body have polarization conditions represented by the points 0 and 47 respectively in Fig. 14. This treatment resembles that described in connection with Fig. 13 except for the higher temperature $T_2$ at which the initial polarization is carried out. The temperature of each step of the treatment is indicated alongside the arrows in Fig. 14.

The body subsequently is subjected to a polarizing field of polarity opposite from that of the first-mentioned field, while maintaining at least some of the previously depolarized portions at a temperature in the neighborhood of the one predetermined temperature $T_2$ to permit polarization thereof in the polarity of the last-mentioned field, and while maintaining other portions of the body at a temperature substantially lower than the one predetermined temperature $T_2$ to minimize depolarization thereof. Thus, the entire body may be cooled to a temperature $T_1$, which may be somewhat lower than room temperature, a surge of heat then applied to the left hand portion of the body to raise it to the neighborhood of the temperature $T_2$, and a negative field applied and removed while these temperature conditions exist. The right hand portion, being colder, has an electrostatic coercive force considerably greater than the coercive force for the temperature $T_2$, with the result that it passes through the point 53 to reach the point 54 in the graph of Fig. 14 with a rather small loss of its positive polarization. Simultaneously the left hand portion of the body passes through the point 56 to achieve the negative remanent polarization represented by the point 57 in the graph. Preferably, the positive and negative polarizations represented by the points 54 and 57 in the graph may be made substantially equal to each other, and the sum of the two polarizations is made substantially greater than the original polarization 47. In this way, the transducing properties may be represented as in the plot of Fig. 4, with the plane of the center line 24 of the material coinciding rather closely with points having zero values of the transducing properties, represented as mentioned above at $C_0$ in the qualitative plot of Fig. 4, and with a greater difference between the extreme values of the transducing characteristics than can be obtained by treatment in accordance with Fig. 13.

The specific embodiments of the present invention which have been discussed hereinabove relate to transducer devices comprising substantially homogeneous bodies of dielectric material. In the examples described, the bodies are of the same composition throughout and, as regards macroscopic properties, are ideally homogeneous except for variations in the state of polarization and the consequent variations in electromechanical properties. However, essentially noncomposite bodies, substantially free of structural discontinuities, may be formed which have a substantial variation with location through the body of the composition of the material constituting the body. Transducer-devices electromechanically sensitive to bending and comprising such noncomposite bodies are the subjects of an application Serial No. 67,741, which isssued as Patent No. 2,624,853, dated January 6, 1953, filed concurrently herewith in the name of Harry C. Page and assigned to the same assignee as the present invention. There is disclosed and claimed in this copending application a transducer device comprising such a body, substantially free of structural discontinuities, in which the variation of composition is such as to provide a body having one portion which is conditioned by the application of a unidirectional potential to provide a substantial transducing-response characteristic and having another portion of a material of different composition which upon the application of the unidirectional potential has a different transducing-response characteristic. In a particular case the latter portion has effectively a zero-valued characteristic and has a relatively high dielectric constant. When a signal potential appears across such a body, the portions with different dielectric constants act as a voltage divider made up of condensers in series, and the voltage division is such that the field strength is higher in the portions having the lower dielectric constant. Thus, the larger part of the signal potential appears across the electromechanically sensitive portions of the body, increasing the efficiency of transducing.

An essentially noncomposite body having portions of materials of different compositions may be made by dipping a heavy paper strip first in a suspension of a selected ceramic raw material then in a suspension of a ceramic raw material of a different composition, followed by heating to ceramic-firing temperatures to provide a fired body having two thickness portions resulting from the two dips. The material of one of these portions is susceptible, after firing, to conditioning by the application of a unidirectional potential to provide an electromechanical response property, while the material of the other portion is chosen to be effective, upon firing and the application of the unidirectional potential, to provide a different-valued electromechanical response property, for example a zero-valued property. Suitable materials can be used to form a noncomposite structure with only occasional, if any, irregularities of structure in the region of changing composition. Such a method of making a ceramic body is disclosed and claimed in an application Serial No. 67,695, filed concurrently herewith in the name of Charles K. Gravley and assigned to the same assignee as the present invention, which issued as Patent No. 2,569,163 on September 25, 1951.

A transducer device of a different type but having an operation analogous to that of the variable composition device mentioned hereinabove also may be made. Such a device comprises a body likewise substantially free of structural discontinuities, having one portion of a low conductivity material, and having another portion of a relatively high conductivity material. The low conductivity portion is conditioned by the application of a unidirectional electric potential to provide a substantial transducing-response characteristic.

The high conductivity portion may or may not have substantial electromechanical transducing properties. However, even if the high conductivity portion does have substantial transducing properties, the several portions of the body act as a voltage divider including resistive and capacitive elements, whereby any signal potentials appearing across the body, associated with electrostatic-field signal energy therein and having frequency components in a predetermined operating range, are effectively largely short-circuited across the relatively high conductivity portion so as to be developed primarily across the relatively low conductivity portion having the substantial transducing-response characteristic. The unidirectional conditioning potential likewise is effectively short-circuited across the high conductivity portion. The variation of conductivity might be obtained in bodies having a considerable variation of composition of the material constituting the body. In such a case, however, the conductive portions of the body advantageously would have a composition characterized by negligible transducing properties.

Moreover, it is possible with only slight or even almost negligible variations in composition to obtain great variations in conductivity. For example, one side of a body of polycrystalline barium titanate material may be subjected to a controlled reducing atmosphere at about 1200° C. for a short period of time just sufficient to render the portions of the body beneath that side conductive to a predetermined depth. By using rather strong reducing conditions but carefully limiting the period of treatment the transitional zone between the portions which are made conductive and the portions which remain essentially nonconductive may be made to occupy only a small part of the total thickness. Although the portions which have been rendered conductive might still retain substantial transducing properties if a substantial field strength could be maintained therein, the short-circuiting effects mentioned above prevent the appearance in the high-conductivity portions of field strengths of magnitudes high enough to excite any very substantial electromechanical response. Thus the transducing-response characteristics of the high-conductivity portions have very low values.

In connection with the division of a signal voltage between the voltage across the portions of the body in which electromechanical response is desired and the voltage across the remaining portions of the body, it is helpful to consider the ratio between the former voltage E and the latter voltage E'. The total potential difference appearing across the body is, of course, $(E+E')$ volts, and it may be assumed that the transitional region between the responsive and non-responsive portions is of negligible thickness. With the further assumption that the responsive and non-responsive regions, that is, the low-conductivity and high-conductivity portions of the body, are of substantially equal thickness, the following condition obtains:

$$\frac{E}{E'} = \frac{\gamma + j\omega\epsilon'}{j\omega\epsilon}$$

where $\gamma$ is the conductivity of the high conductivity portions in ohms per meter, $\epsilon$ and $\epsilon'$ are the dielectric constants of the low conductivity and high-conductivity portions respectively in farads per meter, and $\omega$ is $2\pi$ times the operating frequency component under consideration.

Ordinarily the dielectric constant $\epsilon$ of the electromechanically sensitive material is determined by the choice of a material having desirable electromechanical properties, so that only the numerator of the expression given above for the ratio of voltages may be chosen as a separate design factor. In accordance with a specific feature of the invention disclosed and claimed in the copending Page application identified above, the dielectric constant $\epsilon'$ of the electromechanically insensitive portion of the body is substantially higher than, and may be at least several times as high as, the dielectric constant $\epsilon$ of the sensitive material, although the conductivity $\gamma$ may be negligibly small in the non-responsive as well as in the responsive portions. In this way, a signal potential across the body divides so as to give a field strength several times higher in the responsive portion.

An equally favorable or considerably more favorable voltage distribution is obtained by making the conductivity $\gamma$ of the high conductivity portions of the body much greater than the reactive term $(\omega \epsilon')$ for those portions and much greater than the reactive term $(\omega \epsilon)$ for the low-conductivity portions. Thus, the signal potentials across the body are developed primarily across the relatively low-conductivity portions by virtue of the high conductivity of the other portions. When the high conductivity portions nevertheless retain some dormant transducing properties which may be excited in the event that a substantial electrical field is maintained therein, there is a maximum operating frequency for satisfactory operation, above which the electromechanical response of the conductive portions becomes high enough to counteract materially the response of the other portions and to cause the bending sensitivity to decrease. In such a case, for example when the frequency is so high and the conductivity so low that the reactive term $(\omega \epsilon')$ equals the conductivity $\gamma$, phase distortion is high and the bending response is only about 30% of that when the term $(\omega \epsilon')$ is negligible, while at half that frequency the response is about 96% of the response when $(\omega \epsilon')$ is negligible compared with $\gamma$. Not only does a high conductivity eliminate any possible undesirable electromechanical response of the more conductive portions, but, as explained hereinabove, it also permits most of the signal potential across the body to be developed across the portions in which a high response is desired. When the low conductivity portions are made to be electromechanically sensitive by the preliminary application of a high unidirectional polarizing voltage to the body to produce remanent polarization therein, any effective polarization of the more conductive portions may be minimized by applying the polarizing voltage after the latter portions have been rendered conductive, and the polarizing voltage may be applied gradually so that the polarizing voltage distribution is determined at all times by conductivity, rather than by the capacitance of the materials. A body so polarized may be represented schematically as in Fig. 8.

It will be understood from the discussion hereinabove that, during transducing in a body having a high conductivity portion and a polarized low conductivity portion, for example the left hand and right hand portions respectively of the body 21 as represented in Figs. 3 and 8, bending flexure is associated with mechanical reaction of the high conductivity portion with the low conductivity portion which has a substantial transducing-response characteristic and across which electrical signal potentials primarily are developed.

While it has been assumed in several instances hereinabove that the responsive and non-responsive regions of the noncomposite bender body occupy equal thickness portions of the body, the present invention is not limited to such a case. In fact, particularly when the non-responsive portion is relatively highly conductive, it may prove advantageous to make the responsive portion considerably thinner than the non-responsive portion. One advantage of such a design is that the available electrical energy is concentrated nearer a major surface of the body, where the bending moments are greatest.

Referring now to Fig. 15, there is illustrated schematically a transducer arrangement including a microphone 61 of any suitable type coupled to the input circuit of an audio amplifier 62. The output circuit of the amplifier 62 is connected through a blocking condenser 63 to the opposed electrodes 22, 23 of a transducer device comprising the noncomposite body 21. The body 21 preferably is of a type in which one thickness portion has low effective values of its transducing characteristic by virtue of a treatment rendering it conductive in a manner described hereinabove. Therefore the conductive portions of the body 21 cannot acquire an appreciable electrostatic polarization even when the body is conditioned by the application of a high biasing potential across the body. Under these circumstances a high voltage bias source 64 may be connected to the electrodes 22, 23 through a switch 66 and a decoupling resistor 67. This resistor should have a high resistance to provide a large time constant, so as to avoid the possibility of any polarization of the relatively conductive portion by transient voltages. With the switch 66 closed during operation, the bias voltage impressed across the body polarizes the nonconductive portion of the body. In operation, audio frequency acoustical energy reaching the microphone 61 is amplified as electrical signals in the amplifier 62 and applied to actuate the transducer element 21, which for example, may drive a mechanical coupling arrangement, not shown, for the purpose of cutting a phonograph record in the conventional manner. Signal amplitudes may be used having occasional peak values of the same order of magnitude as the bias voltage, since with the switch 66 closed any momentary loss of bias polarization is overcome quickly by recharging through the decoupling resistor 67. A polarizing arrangement such as that including the unidirectional voltage source 64, switch 66, and resistor 67 may be used in many cases for effecting polarization by the application of a suitable electrostatic field, for example as required to produce the polarization conditions represented in Figs. 7, 8, 11, and 12.

After one side of a dielectric body has been rendered conductive as described hereinabove, the local transducing properties across the body in the thickness direction may be roughly as represented in Fig. 4. When the chemical treatment causing a high-conductivity condition is applied to the left hand side of a polycrystalline dielectric body such as that shown in section in Fig. 3, the transducing characteristic has a zero value $B_0$ at the left hand side of the plot of Fig. 4, since only the untreated right hand portion of the thickness of the body can sustain an appreciable electric field. As the conditions of chemical treatment are varied so that the thickness of the high conductivity, left hand portion is made increasingly greater relative to the thickness of the dielectric right hand portion, it is found that the transitional zone of intermediate conductivities between the high conductivity and low conductivity portions occupies an increasingly greater fraction of the total thickness of the body. This is a result of the diffusion phenomena associated with the propagation of the chemical reducing reaction through the body. Consequently, it is desirable, if practicable, to limit the zone of chemical change to a small portion of the thickness of the body near its major surfaces, thus minimizing the thickness of the transitional portions.

This result may be achieved by heating the entire body, comprised of a titanate raw material, to ceramic-firing temperatures in a moderately reducing atmosphere. Only mildly reducing conditions are necessary to effect the slight variation in composition necessary to achieve a rather uniform high conductivity of the entire body. Subsequently during the firing exposure of both sides of the body to rather strong oxidizing conditions for only a brief period of time provides individual substantial portions of relatively low conductivity material near each of the two major surfaces of the body, while retaining another substantial central portion of a relatively high conductivity material between the portions of low conductivity material. In a preferred arrangement, a thin noncomposite body made in this way for use in a transducer device has near the major surfaces of the body portions of permanently polarizable dielectric material of negligible conductivity, and has a relatively thick portion of rather high electrical conductivity between the dielectric portions.

Fig. 16 illustrates in greatly enlarged cross section the body just described. This body is designated 21' to distinguish it from the body 21 of the preceding figure, since the body 21' has a general distribution of its transducing properties in the thickness direction different from the distribution represented in Fig. 4 for the body 21. The body 21' is provided with electrodes 22 and 23, as is the case with the body 21. The qualitative variation of the conductivity of the body 21' in the thickness direction is represented in Fig. 17, in which the thickness coordinate is aligned vertically with the thickness direction of the body as illustrated in Fig. 16. Fig. 17 indicates that the non-conductive portions occupy relatively small fractions of the total thickness of the body.

The dielectric portions of the body 21' near the major surfaces thereof desirably should have substantial remanent electrostatic polarization in opposite senses with consequent oppositely sensed electromechanical transducing properties. These conditions may be obtained through the use of the polarizing arrangement illustrated in Fig. 16. This arrangement makes use of the fact that the central portion of the body 21' is adapted to serve as a terminal for the unidirectional polarizing potential. A conductive paste or solder is applied temporarily to the conductive central portion at an edge or edges of the body, as at 71 in Fig. 16, and connected through a high resistance 72 and a switch 73 to one side of a high voltage polarizing source 74. The other side of the source 74 is connected to both of the electrodes 22 and 23 in parallel. When the switch 73 is closed, the polarizing voltage is applied in opposite polarities, relative to the direction of the thickness coordinate as indicated in Fig. 16, to the dielectric portions near the major surfaces of the body. After polarizing is complete, the switch 73 is opened and the polarizing connections may be removed from the electroded body. The transducing properties of the polarized body are represented qualitatively in the plot of Fig. 18, in which the thickness coordinate is aligned vertically with Figs. 16 and 17. Since the high conductivity central portion of the body does not sustain a substantial polarizing voltage drop, the local transducing properties in that portion have zero value, as indicated in Fig. 18. The dielectric portions near the major surfaces, however, have high remanent electrostatic polarizations in opposite senses with very narrow transitional zones between polarized and conductive portions, as appears from Figs. 17 and 18. Consequently the outer portions have oppositely sensed electromechanical transducing properties.

When the body 21' is used in a transducer device such as that illustrated in Fig. 5, the mechanical motion of the rod 29 accompanying the flexure or bending of the body is associated with mechanical reaction between the conductive central portion of the body and the oppositely polarized dielectric portions of low conductivity near the surfaces. The latter portions tend to deform in opposite senses near the respective major surfaces of the body during transducing, since they are polarized in opposite senses but are subjected to an electric field having the same sense throughout the body during transducing from electrical to mechanical energy. Hence the application of signal potentials across the electrodes 22 and 23 causes bending motions, resulting in motions of the rod 29 in the directions indicated by the double arrow in Fig. 5. No direct electrical connection to the conductive portion is necessary during transducing, and most of the potential developed across the body is short-circuited across the conductive portion. The response of the transducer is increased by about 6 decibels, as compared with the transducer described hereinabove having a conductive portion and one relatively thin dielectric portion near only one major surface of the body, since each of the two dielectric portions of the body 21' contributes to its bending response. The farther the relatively thin dielectric portions are from the center of the line of the body, the greater the bending moments which they exert. If it is assumed that the central portion is for practical purposes a perfect conductor, a major design consideration in determining the combined thicknesses of the conductive and dielectric portions is the desired bending stiffness of the body, determining its mechanical impedance, which should be matched to the impedance of the mechanical system including the rod 29. The thickness of the conductive portions determines the capacitance, a very small thickness giving a high capacitance. Of course, the device including the body 21' also may be made to operate in an analogous manner to provide transducing from mechanical to electrical energy.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A transducer device electromechanically sensitive to flexure comprising: a homogeneous body of small thickness compared with the other dimensions thereof and free of structural discontinuities, having one substantial portion of a dielectric material which has remanent electrostatic polarization in a thickness direction to provide a substantial transducing-response characteristic as between mechanical signal energy and electrostatic-field signal energy, and having another substantial portion also of said dielectric material which has remanent electrostatic polarization of only a lower order of magnitude than said remanent polarization of said one portion to provide a transducing-response characteristic as between said signal energies lower in magnitude than said first-mentioned characteristic; means including electrodes adjacent to said body for translating currents associated with said electrostatic-field signal energy in said body; and mechanical means for translating the motion associated with said flexure during transducing, said flexure being associated with mechanical reaction between said one portion having said substantial transducing-response characteristic and said other portion of said body.

2. A transducer device electromechanically sensitive to flexure comprising: a homogeneous body of small thickness compared with the other dimensions thereof and substantially free of structural discontinuities, having one substantial portion of a dielectric material which has substantial remanent electrostatic polarization in one thickness direction to provide therein a substantial transducing-response characteristic as between mechanical signal energy and electrostatic-field signal energy, and having another substantial portion also of said dielectric material which has a substantial remanent electrostatic polarization in the opposite thickness direction to provide therein a substantial transducing-response characteristic as between said signal energies but oppositely sensed from said first-mentioned transducing-response characteristic; means including electrodes adjacent to said body for translating currents associated with said electrostatic-field signal energy in said body; and mechanical means for translating the motion associated with said flexure during transducing, said flexure being associated with mechanical reaction between said oppositely polarized portions of said body.

3. A transducer device electromechanically sensitive to flexure comprising: a body substantially free of structural discontinuities; two electrodes adjacent to generally opposed surfaces of said body, said body having between said two electrodes one substantial portion of a dielectric material which is conditioned by the application of a unidirectional electric potential in a direction between said two electrodes to provide in said one portion a substantial transducing-response characteristic as between mechanical signal energy and electrostatic signal energy involving a field in a direction between said two electrodes, and having between said two electrodes another substantial portion of a material which has a transducing-response characteristic as between said signal energies substantially different from said first-mentioned characteristic; means including said electrodes for translating currents associated with said electrostatic-field signal energy in said body; and mechanical means for translating the motion associated with said flexure during transducing, said flexure being associated with mechanical reaction between said one portion having said substantial transducing-response characteristic and said other portion of said body.

4. A transducer device electromechanically sensitive to flexure comprising: a body of small thickness compared with the other dimensions thereof and substantially free of structural discontinuities; two electrodes individually adjacent to the opposed major surfaces of said body, said body having between said two electrodes one substantial thickness portion disposed generally parallel to said major surfaces and of a dielectric material which is conditioned by the application of a unidirectional electric potential in a direction between said two electrodes to provide in said one portion a substantial transducing-response characteristic as between mechanical signal energy and electrostatic signal energy involving a field in a direction between said two electrodes, and having between said two electrodes another substantial thickness portion disposed generally parallel to said one portion and of a material which has a transducing-response characteristic as between said signal energies substantially different from said first-mentioned characteristic; means including said electrodes for translating currents associated with said electrostatic-field signal energy in said body; and mechanical means for translating the motion associated with said flexure during transducing, said flexure being associated with mechanical reaction between said one portion having said substantial transducing-response characteristic and said other portion of said body.

5. A transducer device electromechanically sensitive to flexure comprising: a polycrystalline body substantially free of structural discontinuities; two electrodes adjacent to generally opposed surfaces of said body, said body having between said two electrodes one substantial portion of a dielectric material which is conditioned by the application of a unidirectional electric potential in a direction between said two electrodes to provide in said one portion a substantial transducing-response characteristic as between mechanical signal energy and electrostatic signal energy involving a field in a direction between said two electrodes, and having between said two electrodes another substantial portion of a material which has a transducing-response characteristic as between said signal energies substantially different from said first-mentioned characteristic; means including said electrodes for translating currents associated with said electrostatic-field signal energy in said body; and mechanical means for translating the motion associated with said flexure during transducing, said flexure being associated with mechanical reaction between said one portion having said substantial transducing-response characteristic and said other portion of said body.

6. A transducer device electromechanically sensitive to flexure comprising: a body primarily of polycrystalline barium titanate and substantially free of structural discontinuities; two electrodes adjacent to generally opposed surfaces of said body, said body having between said two electrodes one substantial portion of a dielectric material which is conditioned by the application of a unidirectional electric potential in a direction between said two electrodes to provide in said one portion a substantial transducing-response characteristic as between mechanical signal energy and electrostatic signal energy involving a field in a direction between said two electrodes, and having between said two electrodes another substantial portion of a material which has a transducing-response characteristic as between said signal energies substantially different from said first-mentioned characteristic; means including said electrodes for translating currents associated with said electrostatic-field signal energy in said body; and mechanical means for translating the motion associated with said flexure during transducing, said flexure being associated with mechanical reaction between said one portion having said substantial transducing-response characteristic and said other portion of said body.

7. A transducer device electromechanically sensitive to flexure comprising: a body substantially free of structural discontinuities, having a single pair of electrodes individually adjacent to two opposed surfaces of said body, having between said electrodes one substantial portion of a dielectric material which is conditioned by the application of a unidirectional electric potential to provide a substantial transducing-response characteristic as between mechanical signal energy and electrostatic-field signal energy, and having between said electrodes another substantial portion of a material which has a transducing-response characteristic as between said signal energies substantially different from said first-mentioned characteristic; means including said pair of electrodes for translating currents associated with said electrostatic-field signal energy in said body; and mechanical means for translating the motion associated with said flexure during transducing, said flexure being associated with mechanical reaction between said one portion having said substantial transducing-response characteristic and said other portion of said body.

8. A transducer device electromechanically sensitive to flexure comprising: a body substantially free of structural discontinuities, having one substantial portion of a dielectric material which is conditioned by the application of a unidirectional electric potential to provide a substantial transducing-response characteristic as between mechanical signal energy involving expansion or contraction in one direction within said body and electrostatic signal energy involving a field directed transversely of said one direction, and having another substantial portion of a material which has a transducing-response characteristic as between said signal energies substantially different from said first-mentioned characteristic; means including electrodes adjacent to said body for translating currents associated with said transverse electrostatic-field signal energy in said body; and mechanical means for translating the motion associated with said flexure during transducing, said flexure being associated with mechanical reaction between said one portion, having said substantial transducing-response characteristic involving said expansion or contraction, and said other portion of said body.

9. A transducer device electromechanically sensitive to flexure comprising: a body of small thickness compared with the other dimensions thereof and substantially free of structural discontinuities, having one substantial portion of a dielectric material which is conditioned by the application of a unidirectional electric potential to provide a substantial transducing-response characteristic as between mechanical signal energy involving expansion or contraction in a long direction within said body and electrostatic signal energy involving a field directed transversely in a thickness direction within said body, and having another substantial portion of a material which has a transducing-response characteristic as between said signal energies substantially different from said first-mentioned characteristic, the portions of said body near the two major surfaces thereof having substantially the extremes of values of said transducing-response characteristics in said body; means including electrodes adjacent to said major surfaces for translating currents associated with said transverse electrostatic-field signal energy in said body; and mechanical means for translating the motion associated with said flexure during transducing, said flexure being associated with mechanical reaction between said one portion, having said substantial transducing-response characteristic involving said expansion or contraction, and said other portion of said body.

10. The process of producing a transducer device electromechanically sensitive to flexure comprising: placing conductive electrodes adjacent to two generally opposed surfaces of a homogeneous body of polycrystalline dielectric material capable of acquiring remanent electrostatic polarization; applying a unidirectional electric potential across said electrodes for a predetermined period of time to induce such remanent polarization in said material and provide a substantial transducing-response characteristic therein as between mechanical signal energy and electrostatic-field signal energy; subjecting a first substantial portion of said homogeneous body to localized heating to eliminate at least partially both said remanent electrostatic polarization and said concomitant transducing-response characteristic in said one portion while retaining said remanent polarization in a second substantial portion of said dielectric material, whereby said body acquires an electromechanical sensitivity to flexure associated with mechanical reaction between said second portion which retains said transducing-response characteristic and said first portion; and affixing to said body mechanical motion-translating means adapted to move in accordance with said flexure during transducing.

HANS G. BAERWALD.

References Cited in the file of this patent
UNITED STATES PATENTS

| Number | Name | Date |
|---|---|---|
| 355,149 | Dolbear | Dec. 28, 1886 |
| 1,803,274 | Sawyer | Apr. 28, 1931 |
| 2,388,242 | Arndt | Nov. 6, 1945 |
| 2,394,670 | Detrick | Feb. 12, 1946 |
| 2,402,515 | Wainer | June 18, 1946 |
| 2,540,412 | Adler | Feb. 6, 1951 |